(12) United States Patent
Handley

(10) Patent No.: US 6,816,621 B1
(45) Date of Patent: Nov. 9, 2004

(54) METHOD FOR GENERATING SHIFT-INVARIANT FILTERS

(75) Inventor: John C. Handley, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/561,609

(22) Filed: Apr. 27, 2000

(51) Int. Cl.[7] .............................................. G06K 9/40
(52) U.S. Cl. .................... 382/260; 708/300; 708/314; 708/819
(58) Field of Search ............................. 382/232, 260, 382/261, 262, 263, 264, 265; 708/191, 205, 209, 234, 497, 552, 710, 821, 203, 300, 314, 819; 712/16, 202, 233, 221, 211, 249

(56) References Cited

U.S. PATENT DOCUMENTS

| | | | | |
|---|---|---|---|---|
| 4,589,084 A | * | 5/1986 | Fling et al. ................. | 708/551 |
| 4,661,948 A | * | 4/1987 | Shapiro et al. ............. | 370/295 |
| 4,771,396 A | * | 9/1988 | South et al. ................. | 708/319 |
| 4,941,191 A | * | 7/1990 | Miller et al. ................ | 382/261 |
| 5,689,592 A | * | 11/1997 | Ericsson et al. ............ | 382/304 |
| 5,873,081 A | * | 2/1999 | Harel .......................... | 707/3 |
| 6,071,004 A | * | 6/2000 | Le Gall et al. .............. | 712/22 |
| 6,173,388 B1 | * | 1/2001 | Abercrombie et al. ....... | 712/22 |

* cited by examiner

Primary Examiner—Bhavesh M. Mehta
Assistant Examiner—Abolfazl Tabatabai
(74) Attorney, Agent, or Firm—Fay, Sharpe, Fagan, Minnich & McKee, LLP

(57) ABSTRACT

A novel method is presented for implementing a filter for processing a discrete signal having the steps of first obtaining a plurality of sample values from the discrete signal; then using each sample value to retrieve a bit vector from a plurality of tables. Afterwhich, a logical AND step is performed on the set of retrieved bit vectors; and a determination is made as to whether the resultant bit vector is comprised of all zeros or not. If so, then a predetermined default action is performed, otherwise the position of a non-zero bit in the bit vector is determined and the non-zero bit position is then used to generate a value of the filter.

17 Claims, 4 Drawing Sheets

| $X_i[0]$ | 0 | 1 | 0 | 1 | 1 |
|---|---|---|---|---|---|
| $X_i[16]$ | 1 | 0 | 1 | 1 | 0 |
| $X_i[32]$ | 1 | 1 | 1 | 0 | 0 |
| $X_i[48]$ | 0 | 1 | 1 | 1 | 0 |
| $X_i[64]$ | 0 | 0 | 1 | 1 | 0 |
| $X_i[80]$ | 1 | 0 | 0 | 1 | 0 |
| $X_i[96]$ | 1 | 0 | 0 | 1 | 0 |
| $X_i[112]$ | 1 | 0 | 0 | 1 | 0 |
| $X_i[128]$ | 1 | 0 | 0 | 1 | 0 |
| $X_i[144]$ | 0 | 0 | 0 | 0 | 1 |
| $X_i[160]$ | 1 | 1 | 0 | 0 | 1 |
| $X_i[176]$ | 0 | 1 | 1 | 0 | 1 |
| $X_i[192]$ | 1 | 1 | 1 | 0 | 1 |
| $X_i[208]$ | 1 | 1 | 1 | 0 | 1 |
| $X_i[224]$ | 1 | 1 | 1 | 0 | 1 |
| $X_i[240]$ | 0 | 1 | 1 | 0 | 1 |

FIGURE 2

METHOD FOR GENERATING SHIFT-INVARIANT FILTERS

REFERENCE TO COPENDING APPLICATIONS

Attention is directed to commonly owned and assigned copending Application Numbers:

U.S. Ser. No. 09/561,608, filed Apr. 27, 2000 entitled "A METHOD TO PROGRAM A NONLINEAR FILTER".

U.S. Ser. No. 09/559,506, filed Apr. 27, 2000 entitled "A METHOD FOR GENERATING INCREASING SHIFT-INVARIANT FILTERS".

U.S. Ser. No. 09/559,476, filed Apr. 27, 2000 entitled "A METHOD TO PROGRAM BIT VECTORS FOR AN INCREASING NONLINEAR FILTER".

The disclosure of the above mentioned copending applications are incorporated herein by reference in their entirety.

FIELD OF THE INVENTION

The present invention is generally related to the field of signal processing and, more particularly, to the field of programmable hardware and/or software filtering of image data in compact architectures with windowed shift-invariant filters operating on signals with two or more levels per sample.

BACKGROUND OF THE INVENTION

In the arts it is often necessary to manipulate a received signal or image, for both practical and operational reasons. For instance, the signal may need to be compressed prior to some secondary operation being performed on the data such as transmission over a cable or phone wire. On the receiving end, compressed transmitted signals may eventually need to be restored or reconstructed to return the signal upon receipt to its original form. Other operations can take the form of feature detection or pattern recognition, among others. In order to manipulate the received signal or image data in these instances, mathematical operations are often performed. To achieve this, the discrete signal or image is often converted into or represented by a mathematical sequence or array of discrete values. For example, binary signals or images often take the form of discrete values of [0,1] and 8-bit gray-scale images often take the form of values in the range of [0 . . . 255]. The field of discrete signal and image processing, both theoretical and applied, is relatively dominated by mathematics in the form of specific methods and applications.

Many methods of signal or image processing use one or more applications involving filters. A filter operates by capturing a windowed observation of an image or signal. A windowed observation is a collection or vector of samples from the captured image or signal. Based on this vector, a decision, based on some formula or algorithm, is made about the image or signal at a particular position within the image or signal. In general, a filter operates on a set of signal or image samples which are mathematically written as a vector having the form of $(X_1, \ldots, X_N)$.

Many techniques can be found in the arts, of which the following are representative and which are hereby incorporated by reference being made thereto. For example, a filter could be employed to assign one or more specific codewords to a given sample as shown in FIG. 1, (often called vector quantization), as taught by *Vector Quantization and Signal Compression*, A. Gesho and R. M. Gray, 1991. A filter can also assign one or more tags to a center pixel in order to indicate that the vector represented pixels are part of a specific feature of the captured image, such as a line, letter, or symbol. It can also assign a new sample value to the center pixel in order to accomplish the overall goal of a restoration or enhancement of a degraded image, as taught by *Enhancement and Restoration of Digital Documents*, R. P. Loce and E. R. Dougherty, SPIE Press, 1997, and *Enhancement of Digital Documents*, R. P. Loce and E. R. Dougherty, Electronic Imaging Technology, SPIE Press 1999, and *Two-Dimensional Signal and Image Processing*, J. S. Lim, Prentice Hall, 1990. A filter can also be used to predict a sample or pixel value outside the capture window with the aim of reducing the amount of data needed to store the image. This technique is often referred to as predictive encoding as taught by *Digital Image Compression Techniques*, M. Rabbani and P. W. Jones, SPIE Press, 1991. A filter can be used to assign an array of fewer, more restrictive values to this observation (often referred to as either "quantization," "thresholding," or "dithering" as taught by *Digital Halftoning for Printing and Display of Electronic Images*, R. P. Loce, P. G. Roetling, and Y. W. Lin, Electronic Imaging Technology, SPIE Press, 1999. Many others are found in the known literature. Furthermore, other applications of filters used in signal or image processing include, resolution conversion, object detection, speckle-removal, and edge enhancement.

Nonlinear image or signal processing is a general representation of signal or image filtering based on a logical decomposition of a filter into a set of relatively simple operators. Any windowed shift-invariant filter can be represented as a combination of simple operations called hit-or-miss transforms as taught by *Nonlinear Filters for Image Processing*, E. R. Dougherty and J. Astola (eds.), SPIE/IEEE Press, 1999. The term nonlinear refers to the entire class of windowed filters that includes linear filters, i.e., those filters computed by convolution.

Since filters can be highly complex and repeatedly be executed millions of times in rapid succession in order to perform a single operation on a given image or signal, what is needed in the arts are compact, efficient computing architectures directed towards this end. Efficient architectures depend on filter representations. If a filter can be broken down into its base operations, it might be possible to execute the relatively simple operations in parallel in order to achieve high-speed execution and overall efficiency.

*Computational Gray-Scale Morphology on Lattices (A Comparator-Based Image Algebra) Part I: Architecture*, E. R. Dougherty and D. Sinha, Real Time Imaging, Vol. 1, No. 1, 1995, teaches a computer architecture using representations that perform tests in parallel. The representational methods as taught therein express any filtering operation as a collection of logical tests or operations wherein each logical test is associated with a value. If a windowed observation satisfies a test, the filter output is then associated with that value. Although the above architecture is not practical for filters requiring many tests, it does teach a general representational method.

It is the aim of the present invention to overcome the conventional prior art print limitations, as described above, by performing logical comparisons in a more compact and efficient way.

BRIEF SUMMARY OF THE INVENTION

A method for implementing a filter for processing a discrete signal having the steps of first obtaining a plurality of sample values from the discrete signal; then using each sample value to retrieve a bit vector from a plurality of tables. Afterwhich, a logical AND step is performed on the set of retrieved bit vectors; and a determination is made as to whether the resultant bit vector is comprised of all zeros or not. If so, then a predetermined default action is performed, otherwise the position of a non-zero bit in the bit vector is determined and the non-zero bit position is then used to generate a value of the filter.

BRIEF DESCRIPTION OF THE DRAWINGS

FIG. 2 shows a plurality of bit vectors for each value of a particular sample taking 16 values in the range of 0, . . . , 240 wherein each value has an associated bit vector;

What is presented is a method for implementing a filter on a signal utilizing pre-computed fitting information to enable filter computation by a relatively small number of deterministic sequence of table lookups and bit-wise logical operations. The present invention is directed towards those cases of windowed shift-invariant filters operating on signals with two or more levels per sample.

Briefly, the method of the present invention involves the steps of first obtaining a plurality of samples from a discrete signal or image and then using each sample to look up a bit-vector in an array to obtain a plurality of bit vectors. Once the plurality of bit vectors has been obtained, the next step involves performing a logical AND on the obtained bit vectors in order to generate a resultant bit vector from which a position of non-zero entry in the resultant bit vector can be determined. Lastly, the present method involves the step of using the generated resultant position value to look up a final value in the array.

It should also be understood that one skilled in this art would have a solid background in higher mathematics specifically in the fields of nonlinear signal or image processing, and be readily familiar with the concepts of binary operations, basic filtering concepts and operations, and computer architecture and programming.

A filter, whether operating on binary, gray-scale or other multilevel signals, can be mathematically represented as a set of simple tests of interval memberships. This mathematical fact is developed in *Computational Gray-Scale Morphology on Lattices* (*A Comparator-Based Image Algebra*) *Part I: Architecture,* E. R. Dougherty and D. Sinha, Real Time Imaging, Vol. 1, No. 1, 1995, which is incorporated herein by reference. To briefly explain, a filter is represented mathematically as a function which maps a vector X to an output value a. Call S[a] the set of all vectors X which map to a. Each output value a of the filter has a set S[a]. Every possible signal sample X belongs to some S[a]. If X belongs to S[b], for example, then the filter value at X is b. Now each set S[a] can be further partitioned into a set of intervals [A,B] where A is less than or equal to B. Evaluating the filter is equivalent to determining to which interval among a plurality of intervals a signal observation X belongs, and then, given that interval, finding which set S[a] the interval belongs. The first step, finding which interval a signal observation X belongs among a plurality of intervals is known in the art to be a difficult search problem. Each interval either must be tested in turn or the entire set of intervals tested in parallel. The first option requires too much time and the second option requires too much computer memory. The second step of finding the S[a] given an interval is a simple table lookup.

Figure 1:
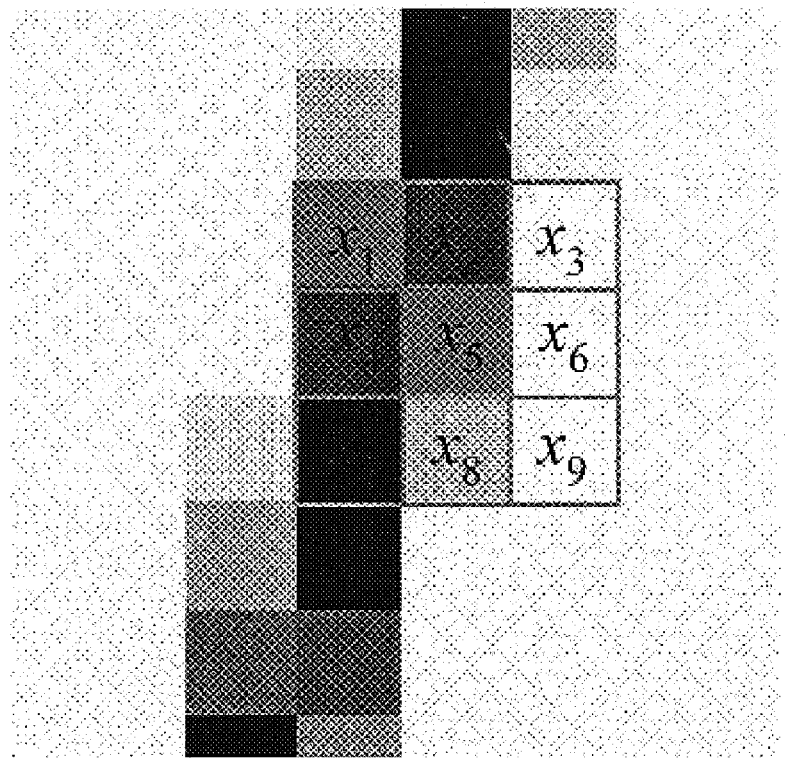
FIG. 1 is an illustration of a segment of a window capture where each pixel is represented by vector notation wherein, based on a windowed observation ($x_1$, $x_2$, $x_3$, $x_4$, $x_5$, $x_6$, $x_7$, $x_8$, $x_9$), modify or tag the center pixel.

With reference being made to the first step of the present invention, non-linear filters can be represented as a set or sequence of logical tests as to whether or not a windowed observation of a signal or captured image falls between two distinct values. For example, FIG. 1 illustrates a windowed observation of a captured gray-scale image wherein nine samples or pixels are represented by vector notation. From these nine samples of captured pixels, a filter would be employed to make one or more decisions or observations with respect to the entire captured gray scale image. Given an observation with N samples, as represented by $X=(X_1, \ldots, X_N)$, and the desire to test whether X is between a lower and an upper value given by $A=(A_1, \ldots, A_N) \leq X \leq B=(B_1, \ldots, B_N)$, wherein component-wise: $A_i \leq X_i \leq B_i$ for each i=1, . . . , N, a filter can be employed to represent a list of the upper and lower pairs [A, B], which is called an interval and each interval has its associated output value. Once it is determined to which interval an observation belongs, the output value of the filter can be determined from this interval.

Figure 3:
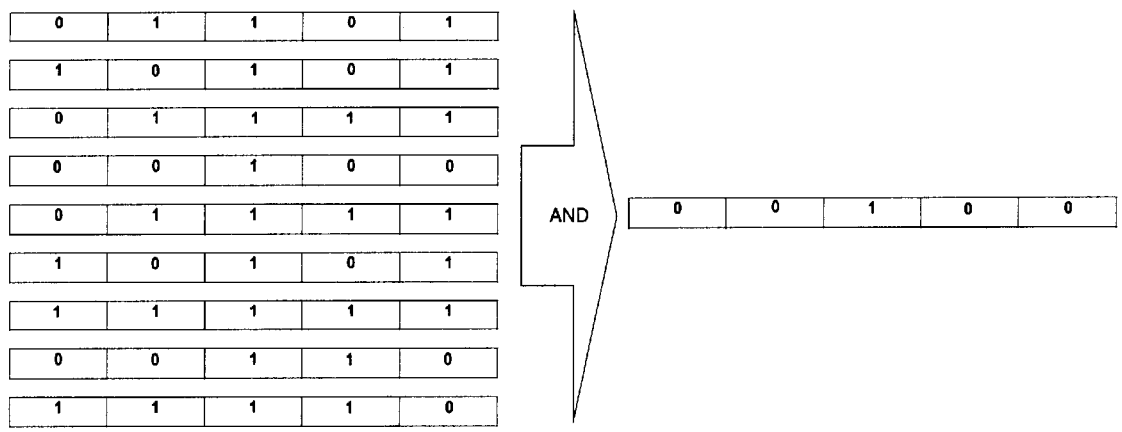
FIG. 3 displays nine example bit vectors from an observation with nine samples to illustrate how samples are related to bit vectors.

Once the plurality of samples from a discrete signal or image have been obtained, the next step of the present invention involves using each sample to look up a bit-vector in an array to obtain a plurality of bit vectors. With reference being made to FIG. 2 which illustrates a plurality of bit vectors for each value of a particular sample taking 16 values in the range of 0, . . . , 240 wherein each value has an associated bit vector. One table is generated for each sample in the window. Tables such as this one describe the interval membership information in a non-linear filter representation. Each column in the table corresponds to an interval in this representation. Once the plurality of bit vectors has been obtained, the next step of the present invention involves the step of performing a logical AND on the obtained bit vectors in order to generate a resultant bit vector from which a position of non-zero entry in the resultant bit vector can be determined. FIG. 3 displays nine example bit vectors from an observation with nine samples to illustrate how samples are related to bit vectors. In accordance with the present invention, the set of nine example bit vectors are AND'ed together to produce a resultant bit vector. In this example, position 2 (counting from left to right and starting at 0) contains a non-zero entry. This position value 2 corresponds to interval 2 and is used to look up the final filter value. If all entries of the resultant bit vector are zero, a default value is presented as the output value of the filter. In the previous step, a non-zero bit position was determined from a resultant bit vector. The position of a non-zero bit corresponds to a label of an interval. A table is maintained that associates each interval label with a filter output value. The bit position is used to index into this table to produce a final filter output value.

Figure 4:
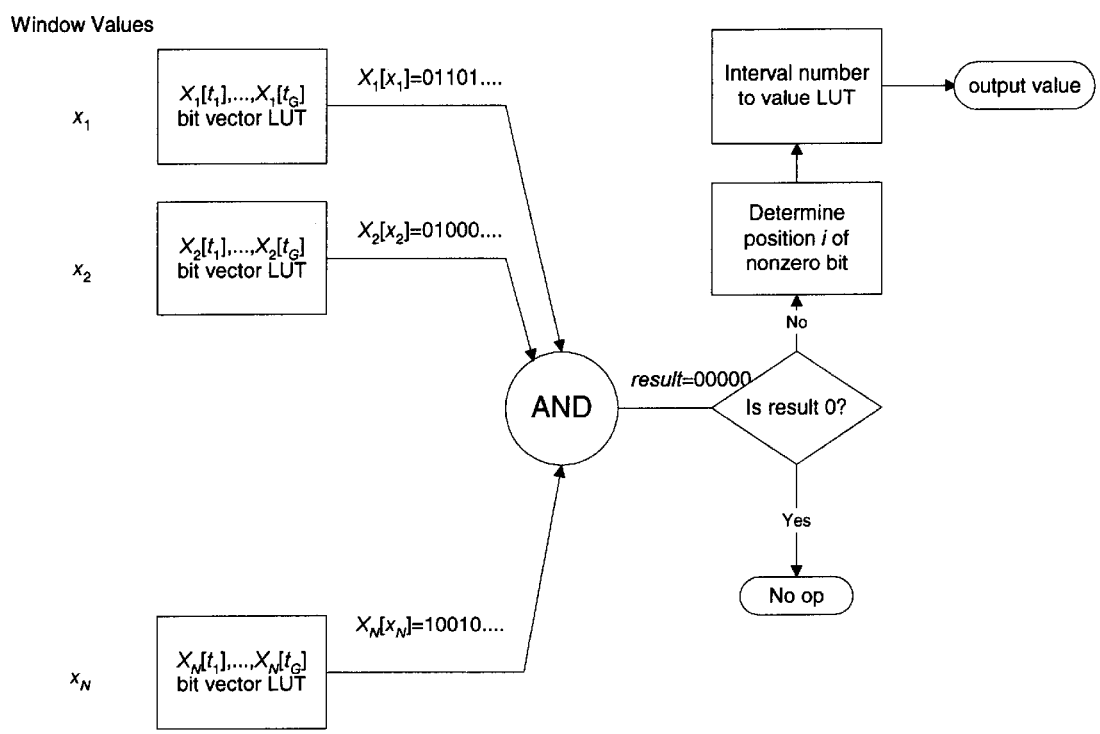
FIG. 4 is a diagram of a bit-vector lookup architecture to evaluate a non-linear filter.

With reference now being made to FIG. 4, a windowed observation of a discrete signal or image is processed. This observation consists of a plurality of discrete sample values, including, but not limited to, binary values (0 and 1) or 8-bit gray values [0, 1, . . . , 255]. Each sample corresponds to a position with in a window. Each sample position has a bit-vector table associated with it. For example, a nine-pixel window has nine separate bit-vector tables (although they may occupy adjacent memory in a computer). Each table has an entry for each value the sample can take. For example, if the samples are binary, each table would have two entries or bit vectors, one for 0 and one for 1. If the samples are 8-bit gray, each table has 256 bit vector entries, one for each value 0 through 255. Each sample value in an windowed observation is used to look up a bit vector in its corresponding table. A set of bit vectors is thus produced, one bit vector for each value in the sample. The bit vector contains at least none non-zero bit value ('1'). The next step in this invention is to obtain the position a non-zero bit value in the bit vector. In the preferred embodiment, the bit values are inspected from left to right until a non-zero bit is obtained. Other embodiments may used specialized hardware logic known in the art to detect the "high" bit. The non-zero bit position is used to index a subsequent table to obtain the final filter value. The final filter value could be a discrete value representing a new signal or image value; it could represent a 'tag' associated with some object or pattern detected in the signal or image; it could represent a code word in a associated with the windowed observation for storage in a compressed or encoded version of the image or signal; it could represent any action or value known in the art for filtering.

It should be understood that the present invention allows all windowed shift-invariant filters to be represented and implemented regardless of the number of samples (window size) and the number of levels per sample (e.g., two levels for binary signals and 256 for eight-bit signals). Any windowed shift-invariant filter can be expressed as a set of intervals and corresponding output values.

Furthermore, it should be understood that the present invention will find its implementations in either hardware or computer software depending on the user's specific requirements. Windowed shift-invariant filters represent a plethora of operations including but not limited to processing sampled digital electrical signals such as used in sensors, sound reproduction, servo-mechanical control, audio data compression, ultrasound, and so on. In two dimensions, windowed shift-invariant filters are used to process image data in medical imaging, remote sensing, machine vision and inspection, document processing, synthetic aperture radar, military target recognition, and so on. Examples are object detection, image enhancement, data compression, thresholding, noise-removal, image reconstruction, resolution conversion, segmentation, watermark insertion and detection, character recognition, and various data manipulations to prepare images for printing or display. Samples may also be obtained from higher-dimensional data such as voxels in a digital three dimensional representation of materials. Further, images may have multiple channels, for example, color images may have three or four channels. Remotely sensed images may be "hyperspectral" and have data in tens of spectral bands, for example, a hyperspectral device may have a plurality of sensors, each sensitive to a specific interval of wavelengths such as long infrared, near infrared, visible, ultraviolet, etc. wherein each sensor may generate signals from electromagnetic radiation in its respective band of sensitivity. The windowed shift-invariant filters can also be applied simultaneously on all image bands using the method of the present invention. For example, a filter may have some samples from a long-wave infrared band, some samples from a near infrared band, some from the visible portion of the light spectrum, and some samples from ultraviolet. When taken together, a windowed observation consists of samples separated in space or time as well as wavelength. The method of the present invention readily finds its implementations on sampled signal or image data whether the data are from spatially arranged sensors or from sensors tuned to different wavelengths or a combination thereof.

In summary, what is presented is a method for implementing a filter on a signal utilizing pre-computed fitting information to enable decreasing filter computation by a relatively small number of deterministic sequence of table lookups and bit-wise logical operations.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is desired to be secured by United States Letters Patent is:

1. A method for implementing a filter for processing a discrete signal comprising:
    obtaining a plurality of sample values from said discrete signal;
    using each sample value to retrieve a bit vector from a plurality of tables;
    performing a logical operation on the set of retrieved bit vectors; and
    determining whether the resultant bit vector is comprised of all zeros and if so, performing a default action, otherwise determining a position of a non-zero bit in the bit vector and using non-zero bit position to generate a value of the filter.

2. A method as in claim 1 wherein the logical operation comprises logically AND'ing.

3. A method as in claim 1 wherein the logical operation comprises logically OR'ing.

4. A method for implementing a shift invariant filter comprising:
    pre-defining an observation window including a plurality of ordered samples, each ordered sample being associated with a unique sample position in the observation window;
    pre-computing respective fitting information for each respective sample position of the plurality of ordered samples for a respective at least one range of possible sample values at each respective sample position;
    pre-associating the respective pre-computed fitting information for each respective sample position and the at least one respective range with a respective bit position in a respective bit vector associated with each respective sample position and the respective at least one respective range;
    receiving a discrete signal;
    applying the observation window to at least a portion of the received discrete signal, thereby associating respective sample values with each of the ordered samples;
    retrieving a respective bit vector for each ordered sample based on the value associated with the ordered sample;
    determining a common aspect, if any, among the respective retrieved bit vectors; and
    selecting an output response based on fitting information associated with the determined common aspect or lack thereof.

5. The method of claim 4 wherein pre-computing respective fitting information comprises:
    pre-computing a final filter value for each respective sample position of the plurality of ordered samples for a respective at least one respective range of possible sample values at each respective sample position.

6. The method of claim 4 wherein pre-computing respective fitting information comprises:

pre-determining a tag for each respective sample position of the plurality of ordered samples for a respective at least one range of possible sample values at each respective sample position.

7. The method of claim 4 wherein pre-computing respective fitting information comprises:

pre-calculating a data compression code word for each respective sample position of the plurality of ordered samples for a respective at least one range of possible sample values at each respective sample position.

8. The method of claim 4 wherein receiving a discrete signal comprises receiving a discrete image signal and wherein applying the observation window comprises:

applying the observation window to at least a portion of the received discrete image signal, thereby associating respective pixel contone values with each of the ordered samples.

9. The method of claim 4 wherein determining a common aspect, if any, among the respective retrieved bit vectors and selecting an output response comprise:

performing a logical bitwise AND'ing operation on the retrieved bit vectors, thereby generating a resultant bit vector having no more than a single non-zero bit; and selecting an output response based on fitting information associated with the position of the non-zero bit in the resultant bit vector or on a lack of a non-zero bit in the result vector.

10. The method of claim 4 wherein determining a common aspect, if any, among the respective retrieved bit vectors and selecting an output response comprise:

performing a logical bitwise OR'ing operation on the retrieved bit vectors, thereby generating a resultant bit vector having no more than a single zero bit; and selecting an output response based on fitting information associated with the position of the zero bit in the resultant bit vector or on a lack of a zero bit in the result vector.

11. A system for implementing a shift invariant filter comprising:

means for pre-associating respective pre-computed fitting information for respective sample positions of an observation window, the observation window including a plurality of ordered samples, each ordered sample being associated with a sample position in the observation window, the pre-computed fitting information being for a respective at least one range of possible sample values at each respective sample position, the at least one respective range being associated with a respective bit position in a respective bit vector associated with each respective sample position;

means for receiving a discrete signal;

means for applying the observation window to at least a portion of the received discrete signal, thereby associating respective sample values with each of the ordered samples;

means for retrieving a respective bit vector for each ordered sample based on the value associated with the ordered sample;

means for determining a common aspect, if any, among the respective retrieved bit vectors; and means for selecting an output response based on fitting information associated with the determined common aspect or lack thereof.

12. The system of claim 11 wherein the means for pre-associating respective pre-computed fitting information comprises:

means for pre-computing a final filter value for each respective sample position of the plurality of ordered samples for a respective at least one respective range of possible sample values at each respective sample position.

13. The system of claim 12 wherein the means for pre-computing respective fitting information comprises:

means for pre-determining a tag for each respective sample position of the plurality of ordered samples for a respective at least one range of possible sample values at each respective sample position.

14. The system of claim 12 wherein the means for pre-computing respective fitting information comprises:

means for pre-calculating a data compression code word for each respective sample position of the plurality of ordered samples for a respective at least one respective range of possible sample values at each respective sample position.

15. The system of claim 11 wherein the means for receiving a discrete signal comprises means for receiving a discrete image signal and wherein the means for applying the observation window comprises:

means for applying the observation window to at least a portion of the received discrete image signal, thereby associating respective pixel contone values of the image signal with each of the ordered samples.

16. The system of claim 11 wherein the means for determining a common aspect, if any, among the respective retrieved bit vectors and the means for selecting an output response comprise:

means for performing a logical bitwise AND'ing operation on the retrieved bit vectors, thereby generating a resultant bit vector having no more than a single non-zero bit; and means for selecting an output response based on fitting information associated with the position of the non-zero bit in the resultant bit vector or on a lack of a non-zero bit in the result vector.

17. The system of claim 11 wherein the means for determining a common aspect, if any, among the respective retrieved bit vectors and the means for selecting an output response comprise:

means for performing a logical bitwise OR'ing operation on the retrieved bit vectors, thereby generating a resultant bit vector having no more than a single zero bit; and means for selecting an output response based on fitting information associated with the position of the zero bit in the resultant bit vector or on a lack of a zero bit in the result vector.

* * * * *